US012499786B2

(12) United States Patent
McLaren et al.

(10) Patent No.: US 12,499,786 B2
(45) Date of Patent: Dec. 16, 2025

(54) PLACARD MOUNTING STRUCTURE

(71) Applicant: Quality Carriers, Inc., Tampa, FL (US)

(72) Inventors: Timothy Neil McLaren, Port Elizabeth (ZA); Stephan Strydom, Uitenhage (ZA); Cedric Vermaak, Uitenhage (ZA); Glen Harm, Jasper, GA (US); Steven Craig, Jasper, GA (US)

(73) Assignee: QUALITY CARRIERS, INC., Tampa, FL (US)

( * ) Notice: Subject to any disclaimer, the term of this patent is extended or adjusted under 35 U.S.C. 154(b) by 202 days.

(21) Appl. No.: 18/464,132

(22) Filed: Sep. 8, 2023

(65) Prior Publication Data

US 2025/0087118 A1 Mar. 13, 2025

(51) Int. Cl.
*G09F 7/18* (2006.01)

(52) U.S. Cl.
CPC ........ *G09F 7/18* (2013.01); *G09F 2007/1865* (2013.01)

(58) Field of Classification Search
CPC ... G09F 7/18; G09F 7/20; G09F 7/205; G09F 2007/1865; G09F 7/08; G09F 7/10; G09F 2007/1843; G09F 15/0012; G09F 15/00; G09F 21/04; G09F 21/048; B60P 3/0255; F16M 11/20; F16M 11/22; F16M 11/24; F16M 11/26
See application file for complete search history.

(56) References Cited

U.S. PATENT DOCUMENTS

| | | | | |
|---|---|---|---|---|
| 1,888,565 A * | 11/1932 | O'Rourke | G09F 7/08 | 40/607.1 |
| 5,283,595 A * | 2/1994 | Krukovsky | G09F 7/20 | 40/607.1 |
| 7,555,859 B1 * | 7/2009 | Kvortek | G09F 7/18 | 40/601 |
| 2004/0221501 A1 * | 11/2004 | Schaak | F16M 11/105 | 40/607.04 |
| 2005/0045782 A1 * | 3/2005 | Lee | F16M 11/22 | 248/176.1 |
| 2014/0263890 A1 * | 9/2014 | McCarthy | F16M 13/02 | 29/428 |
| 2023/0024561 A1 * | 1/2023 | Lee | F16M 11/24 | |

* cited by examiner

*Primary Examiner* — Cassandra Davis

(74) *Attorney, Agent, or Firm* — Quarles & Brady, LLP

(57) ABSTRACT

A device for holding a placard includes a backplate that is engaged with a rail structure and a retention panel that is engaged with the backplate and configured to receive a placard, the retention panel and the backplate being movable between a first position adjacent an end of the rail structure and a second position that is spaced apart from the end of the rail structure. The rail structure includes a first rail and a second rail extending parallel with one another in a first direction.

20 Claims, 7 Drawing Sheets

PLACARD MOUNTING STRUCTURE

RELATED APPLICATIONS

N/A

BACKGROUND

Field of the Disclosure

This disclosure relates generally to a mounting structure and, more specifically, a placard mounting structure for tank containers that transport, store, and dispense contents, e.g., liquids.

Description of the Background of the Disclosure

Tank containers are used for transporting, storing, and dispensing contents, e.g., liquids, across various distances by various means. Tank containers are designed and constructed of various sizes, shapes, and materials, and with various features. Further, tank containers are subject to certain regulations, standards, and codes relating to their sizes, capacities, strengths, etc. Because tank containers are typically used with multiple different contents, including some hazardous contents, and because tank containers are typically opaque so as to conceal the nature of the contents during use, placard holders are located on the exterior of the tank container to identify the contents in the tank container. Hazardous placards are only required to be fitted when the tank container is loaded or when residual product remains prior to cleaning, such that tank container operators must regularly fit and remove placards, especially when the same tank container is used to transport various different contents. Often, the placards are mounted high above the ground so that operators must use access equipment, such as ladders, to replace or remove the placards.

Therefore, there is a need for an improved placard holder.

SUMMARY

Various aspects are described in connection with the illustrative implementations of a placard mounting structure for a tank container disclosed herein.

In one aspect, a device for holding a placard includes a backplate that is engaged with a rail structure and a retention panel that is engaged with the backplate and configured to receive a placard, the retention panel and the backplate being movable between a first position adjacent an end of the rail structure and a second position that is spaced apart from the end of the rail structure. The rail structure includes a first rail and a second rail extending parallel with one another in a first direction.

In some embodiments, the first and second rails are spaced apart from one another in a second direction that is perpendicular to the first direction. In some embodiments, the backplate includes a first sleeve in connection with the first rail and a second sleeve in connection with the second rail. The first and second sleeves are configured to slide along the first and second rails. In some embodiments, the end of the rail structure is a bottom end that is opposite a top end, the bottom end including a bottom bracket that connects the first rail to the second rail. In some embodiments, the rail structure is configured to be mounted to a tank container, such that the second position defines a distance between a lowest point of the retention panel and a foot of the tank container, the distance being between about 54 inches and about 66 inches. In some embodiments, in the second position, the distance is reduced by at least 60%. In some embodiments, the retention panel is configured to engage the backplate in a plurality of configurations that vary in at least one of a location and a number of retention panels.

In some aspects, a device for holding a placard includes a first rail and a second rail extending parallel with one another in a first direction, the first and second rails being spaced apart from one another in a second direction that is perpendicular to the first direction. A backplate is engaged with each of the first rail and the second rail, and a retention panel is engaged with the backplate and configured to receive a placard. The backplate is movably coupled to a support rod by a hinge.

In some embodiments, the retention panel is configured to be movable in the first direction. In some embodiments, the support rod is configured to be rotated about a hinge axis that extends in parallel with the second direction. In some embodiments, the support rod is removably attached to a bottom bracket that extends in parallel with the second direction between the first rail and the second rail. In some embodiments, in a first configuration, the support rod is disposed parallel with the first and second rails in the first direction and the support rod is centrally disposed between the first and second rails relative to the second direction. In some embodiments, in a second configuration, the support rod is rotated about the hinge axis and offset relative to the first direction. In some embodiments, the first direction is a vertical direction and the second direction is a horizontal direction.

In some aspects, a device for holding a placard includes a retention panel that is engaged with a backplate, a support rod that is engaged with the backplate, and a receptacle in which an end of the support rod is removably received. When the end of the support rod is received in the receptacle, the support rod is configured to support the retention panel in a raised position.

In some embodiments, the end of the support rod is removably secured to the receptacle by a fastener. In some embodiments, the support rod includes a handle disposed adjacent the end, such that the handle is located above the receptacle when the end is received therein. In some embodiments, the support rod includes an upper end that is hingedly attached to the backplate. In some embodiments, the backplate is configured to slide along a rail structure between the raised position and a lowered position. In some embodiments, in the raised position, the retention panel is disposed above a midplane that bisects the rail structure between a top bracket and a bottom bracket. In some embodiments, in the lowered position, the retention panel is disposed below the midplane. In some embodiments, the retention panel includes a plurality of retention panels.

DETAILED DESCRIPTION

Before any embodiments are explained in detail, it is to be understood that the embodiments disclosed herein are not limited to the details of construction and the arrangement of components set forth in the following description or illustrated in the following drawings. The embodiments of the present disclosure are capable of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The term "about," as used herein, refers to variations in the numerical quantity that may occur, for example, through typical measuring and manufacturing procedures used for a placard mounting structure or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values ±5% of the numeric value that the term precedes.

Figure 1:
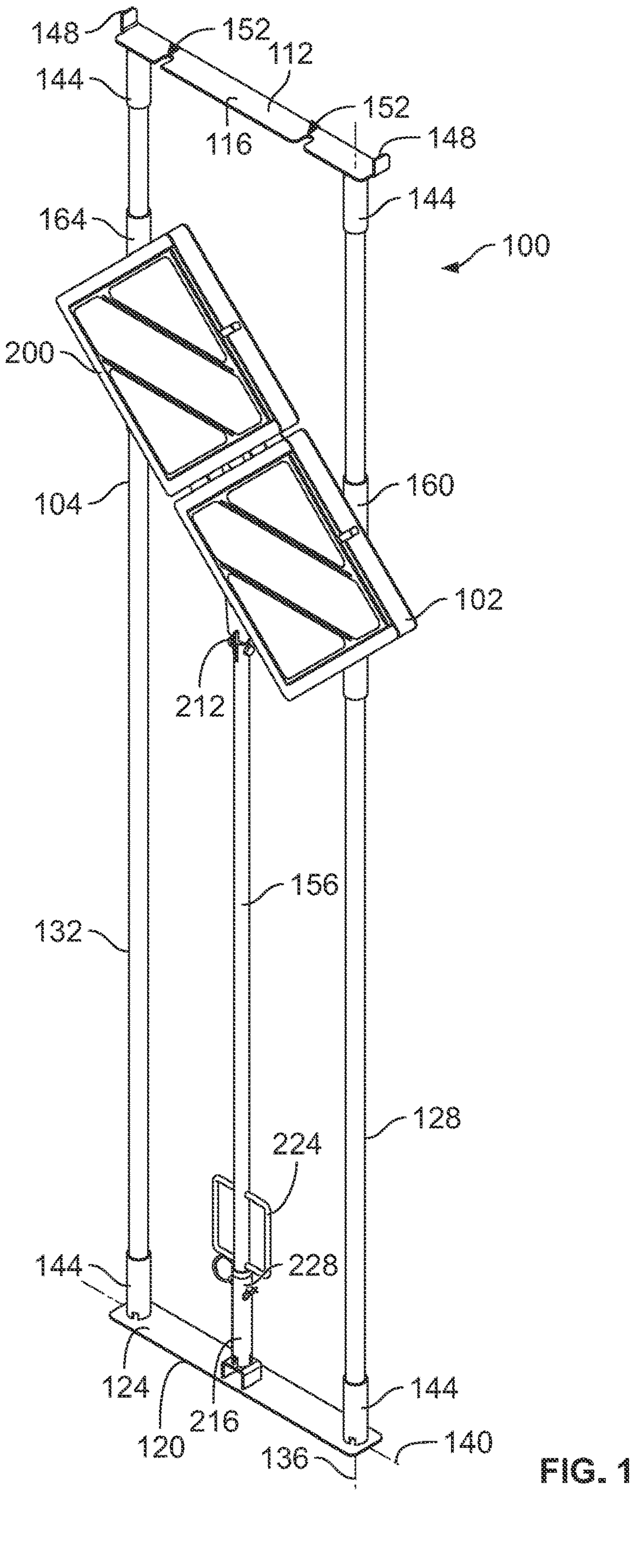
FIG. 1 is a perspective view of a mounting structure, according to an embodiment of the present disclosure.
Figure 2:
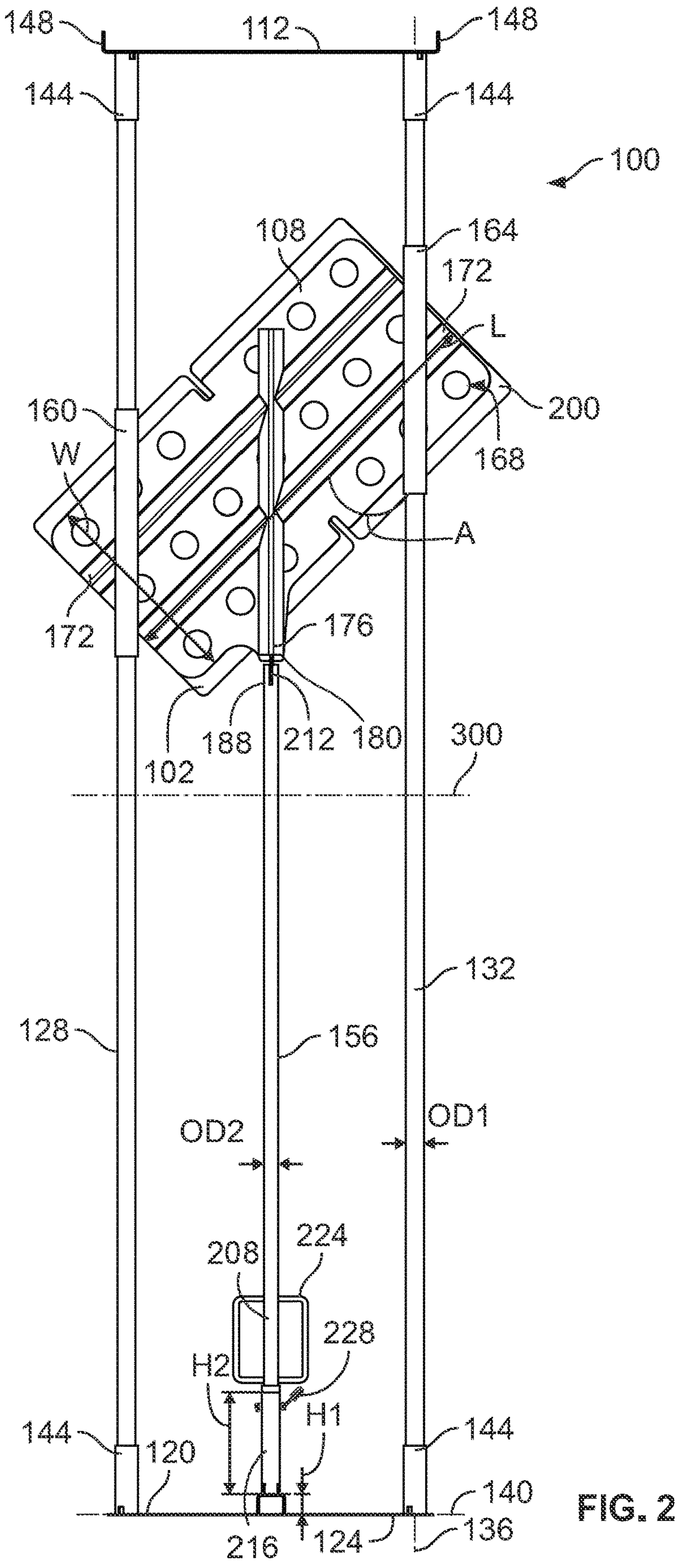
FIG. 2 is a rear view of the mounting structure of FIG. 1.

Referring to FIGS. 1 and 2, a placard mounting structure 100 includes a retention panel 102 that is attached to a rail structure 104 by a backplate 108. In the illustrated embodiment, the placard mounting structure 100 has a top bracket 112 at a top end 116 and a bottom bracket 120 at a bottom end 124 that is opposite the top end 116. The rail structure 104 includes a first rail 128 and a second rail 132 extending between the top bracket 112 at the top end 116 and the bottom bracket 120 at the bottom end 124. In particular, the placard mounting structure 100 defines a first axis or longitudinal axis 136 extending a first direction or vertical direction, which is illustrated as intersecting the first rail 128 of the rail structure 104 in FIG. 1. The first rail 128 and the second rail 132 extend parallel with one another in the first direction and parallel with the first axis 136. Further, placard mounting structure 100 defines a second axis or lateral axis 140 extending in a second direction or horizontal direction, which is illustrated as intersecting the bottom bracket 120 in FIG. 1. The first rail 128 and the second rail 132 are spaced apart from one another in the second direction relative to the second axis 140. In the illustrated embodiment, the first axis 136 and the second axis 140 are disposed perpendicular to one another.

In the illustrated embodiment, the first rail 128 and the second rail 132 are provided in the form of cylindrical rods that extend continuously between the top bracket 112 and the bottom bracket 120. Each end of the first rail 128 and the second rail 132 is received in a sheath 144 that is joined to the top bracket 112 or the bottom bracket 120. Accordingly, the first rail 128 is connected to the second rail 132 by each of the bottom bracket 120 and the top bracket 112. Each of the first rail 128 and the second rail 132 has an outer diameter OD1 that is sized to be received within the sheath 144. Each sheath 144 is identical to one another in size and shape. In some embodiments, one or more of the sheaths 144 is differently sized or shaped relative to another. Further, in some embodiments, the first rail 128 and the second rail 132 may be differently sized and shaped, such as, e.g., having a rectangular or square cross-sectional profile.

Further, the first rail 128 and the second rail 132 may be sized and shaped for aerodynamic performance to reduce drag forces that can occur as a result of being mounted on a moving vehicle, e.g., a tank container. To that end, the first rail 128 and the second rail 132 may have an elliptical shape or an airfoil shape. In a similar fashion, the sheaths 144 may also be sized and shaped to reduce drag forces. In addition, the first rail 128 and second rail 132 can be hollow to reduce a weight of the mounting structure 100, which can lead to greater fuel efficiency and even weight distribution when mounted to a vehicle, e.g., a tank container. In some embodiments, the mounting structure 100 is entirely or partially made of a metal material, such as, e.g., aluminum or alloys thereof, or stainless steel or alloys thereof. In some embodiments, the mounting structure 100 is entirely or partially made of a non-metal material, such as, e.g., plastic or polymer composites, carbon fiber-reinforced composites, or combinations thereof.

As illustrated in FIG. 1, the top bracket 112 includes locator tabs 148 extending upwardly from opposing ends thereof. Further, the top bracket 112 includes notches 152 spaced inwardly of the locator tabs 148 and inwardly of the first rail 128 and the second rail 132. The locator tabs 148 and notches 152 may be configured to assist with aligning and securing the mounting structure 100 to a vehicle or support, as will be described herein.

With continued reference to FIGS. 1 and 2, the retention panel 102 is configured to be movable along the rail structure 104 between the top end 116 or first end and the bottom end 124 or second end of the placard mounting structure 100. In the illustrated embodiment, the retention panel 102 is supported by a support rod 156 that is hingedly coupled to the backplate 108. Referring specifically to FIG. 2, the backplate 108 includes a first sleeve 160 in connection with the first rail 128 and a second sleeve 164 that is in connection with the second rail 132. The first sleeve 160 and the second sleeve 164 are provided in the form of tubular members that are slidably coupled to the first rail 128 and the second rail 132, respectively. Further, the first sleeve 160 and second sleeve 164 are offset from one another in the vertical direction relative to the first axis 136, such that the second sleeve 164 is disposed closer to the top end 116 of the placard mounting structure 100 than the first sleeve 160, although other configurations are possible. In some embodiments, the first sleeve 160 is disposed closer to the top end 116 than the second sleeve 164. In some embodiments, the first sleeve 160 and the second sleeve 164 are not offset relative to one another in the vertical direction. The retention panel 102 is configured to move, e.g., slide, in the vertical direction along the first rail 128 and the second rail 132 by interaction with the first sleeve 160 and the second sleeve 164, respectively, and by operation of the support rod 156, as will be described in further detail herein.

With reference to FIG. 2, the backplate 108 is a rectangular plate-shaped component that is configured to receive the retention panel 102. In the illustrated embodiment, the backplate 108 has a length L and width W, where the length L represents the longitudinal extent of the backplate 108. The backplate 108 includes a plurality of holes 168 for receiving a fastener (not shown) for attachment with the retention panel 102. In addition, the plurality of holes 168 are provided to reduce a total mass of the backplate 108 and, thus, the mounting structure 100, as well as to provide pathways for airflow to reduce drag forces. The retention panel 102 can be mounted to the backplate 108 in a number of different configurations, as will be described further herein. The backplate 108 includes ribs 172 and a spine 176 in the form of thickened, crimped, folded, raised, or corrugated sections for providing structural reinforcement against bending or deformation due to exposure to outside weather conditions and external forces. In particular, the spine 176 is arranged along the vertical direction in parallel with the first axis 136 and the ribs 172 extend along the length L of the backplate 108 at an angle A relative to the first axis 136, which is represented as intersecting the second rail 132 in FIG. 2. Accordingly, it will be understood that the backplate 108 is arranged diagonally between the first rail 128 and the second rail 132 at the angle A relative to the first axis 136. In some embodiments, the angle A is between about 30 degrees and about 60 degrees. The spine 176 is centrally disposed on the backplate 108 and intersects or interrupts the ribs 172. The plurality of holes 168 are formed through the backplate 108 in areas surrounding and between the ribs 172. The backplate 108 includes a tail 180 that extends vertically downward from the backplate 108 along the spine 176 for connection with the support rod 156. The first sleeve 160 and the second sleeve 164 are attached to the backplate 108 using any suitable method, such as, e.g., welding, fastening, adhering, interlocking, or the like. In some embodiments, first sleeve 160 and the second sleeve 164 are removably attached to the backplate 108. In some embodiments, the first sleeve 160 and the second sleeve 164 are integrally formed with the backplate 108 as a single, unitary component. In the illustrated embodiment, the first sleeve 160 and the second sleeve 164 extend across the ribs 172, although other configurations are contemplated.

The support rod 156 is arranged between the first rail 128 and the second rail 132 of the rail structure 104. In particular, the support rod 156 is disposed centrally between the first rail 128 and the second rail 132, such that the support rod 156 is spaced equidistant from the first rail 128 and the second rail 132 relative to the second axis 140. Further, the support rod 156 is shown in a raised configuration or raised position 200 in FIGS. 1 and 2, in which the support rod 156 extends parallel with the first rail 128 and the second rail 132 in the first direction relative to the first axis 136. In some embodiments, the support rod 156 can be arranged differently than shown. For instance, the support rod 156 can be arranged closer to the first rail 128 or the second rail 132, so as to be offset from a central position. In some embodiments, the support rod 156 can extend at an angle relative to the first axis 136 or the second axis 140.

Referring to FIG. 2, the support rod 156 is provided in the form of a cylindrical rod that extends continuously between opposing ends including a link end 188 and a tip end 208. The link end 188 of the support rod 156 is hingedly coupled to the backplate 108 by a hinge assembly 212. The tip end 208 of the support rod 156 is removably received within a receptacle 216 that is centrally disposed on the bottom bracket 120. In the illustrated embodiment, the receptacle 216 is provided in the form of a hollow tubular member that is joined to the bottom bracket 120 by a stand 220. The support rod 156 has an outer diameter OD2 that is configured to be received within the receptacle 216. Further, the support rod 156 includes a handle 224 that is arranged adjacent the tip end 208. In some embodiments, the handle 224 and the support rod 156 are made of the same material. In some embodiments, the handle 224 is made of a metal material. In some embodiments, the handle 224 is made of a non-metal material, such as, e.g., an elastomeric or rubber or plastic material, or the handle 224 is coated with non-metal material. In this way, the handle 224 may be thermally and/or electrically insulated, while also being cushioned or textured to provide operators with an improved grip of the support rod 156. In some embodiments, the handle 224 is attached to the support rod 156 by welding, fastening, or any suitable attachment method. In some embodiments, the handle 224 and the support rod 156 are integrally formed as a unitary element. A fastener assembly 228 is configured to removably connect the support rod 156 to the receptacle 216 in the raised configuration 200, as will be further described herein. The stand 220 extends vertically from the bottom bracket 120 a first height H1 and the receptacle 216 extends vertically from the stand 220 a second height H2. In some embodiments, the first height H1 is about 20% of the second height H2. In some embodiments, the first height H1 is smaller or larger than 20% of the second height H2.

Figure 3:
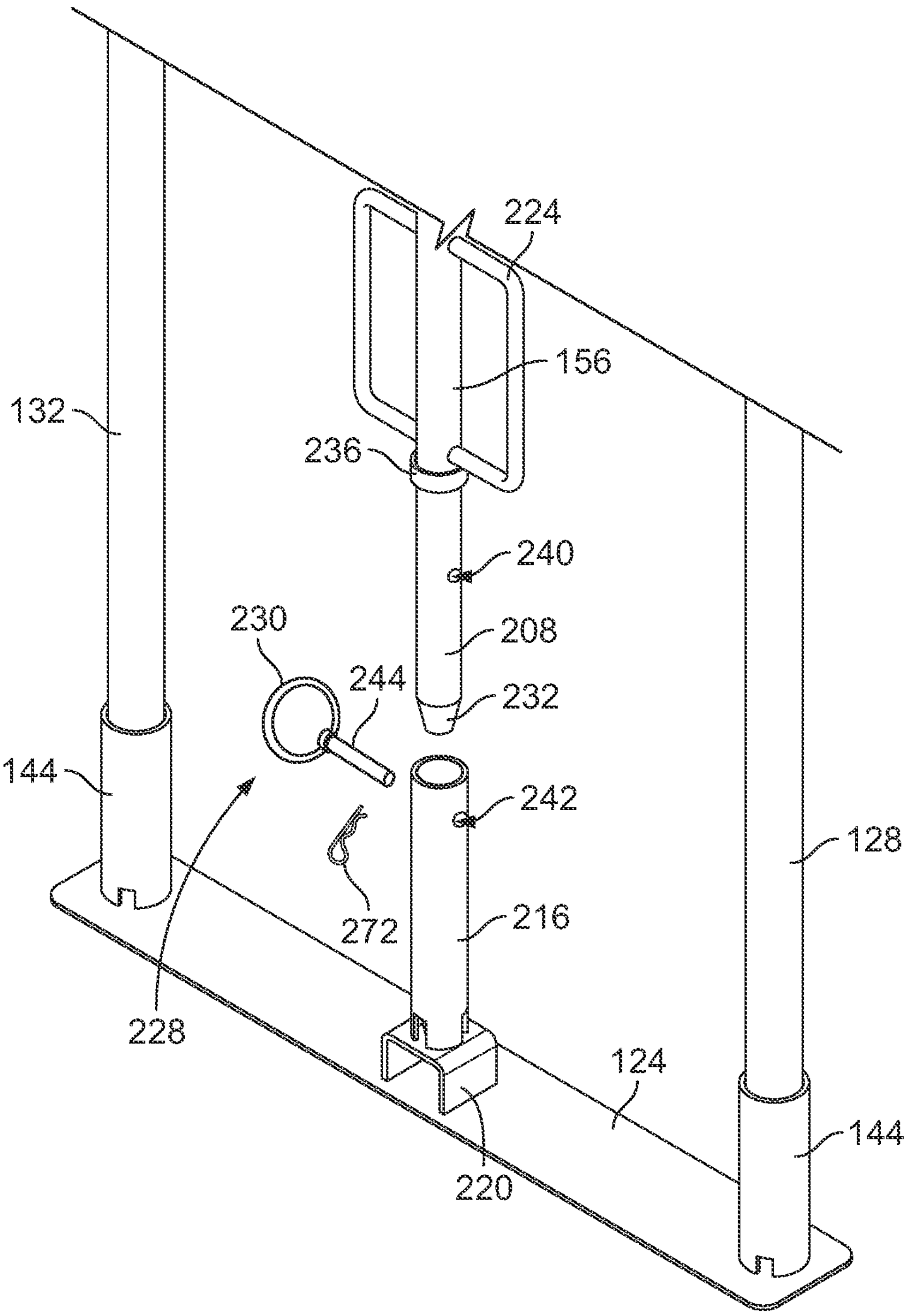
FIG. 3 is a partial, exploded view of a bottom end of the mounting structure of FIG. 1.

Referring now to FIG. 3, the tip end 208 of the support rod 156 includes a frusto-conical tip 232, a collar 236, and an aperture 240 that is disposed between the collar 236 and the tip 232. In the illustrated embodiment, the collar 236 is disposed adjacent and just below the handle 224. The collar 236 circumscribes the support rod 156 and effectively increases the outer diameter thereof to provide a seat for supporting a load, e.g., a weight, of the retention panel 102, the backplate 108, and the support rod 156 itself upon the receptacle 216. The load can also include a placard 260 (see FIG. 5) when secured to the retention panel 102. The tip 232 is configured with the frusto-conical shape to facilitate alignment and ease of insertion within the receptacle 216. The aperture 240 extends entirely through the diameter of the support rod 156 for engagement with the fastener assembly 228. In the illustrated embodiment, the tip 232 is inserted within the receptacle 216 so that the aperture 240 of the support rod 156 is aligned with corresponding holes 242 of the receptacle 216. When the holes 242 are aligned with the aperture 240 of the support rod 156, a bar 244 can be inserted through each of the holes 242 and the aperture 240 to retain the support rod 156 in the raised configuration and to prevent vertical displacement or dislodging from the receptacle 216. Further, a pin 272, which is illustrated as a cotter pin, is inserted through an opening (not shown) in a fastener 230 to prevent horizontal displacement or dislodging of the bar 244 from the receptacle 216 and the support rod 156, thereby securing the support rod 156 to the receptacle 216. In some embodiments, the fastener assembly 228 is provided differently than shown. For example, the fastener assembly 228 can be a nut and bolt assembly, a combination lock, a chain, a rope, threading, or any other suitable fastener for removably securing the support rod 156 to the receptacle 216.

Still referring to FIG. 3, the collar 236 is provided on the support rod 156 at a location that is configured to prevent the load from the being transferred, in part or entirely, onto the fastener assembly 228, thereby preventing shearing or damage to the fastener assembly 228. Additionally, the tip end 208 may be sized and dimensioned to contact or abut the stand 220 to further prevent the load, i.e., weight, from being entirely carried by the fastener assembly 228 and for promoting ease of alignment among the holes 242 of the receptacle 216 and the aperture 240 of the support rod 156. In this way, a user can grasp the handle 224 of the support rod 156 and place the tip end 208 into the receptacle 216 with one hand, at which point the support rod 156 is in the raised configuration 200 and the load is supported by interaction between the collar 236 and the receptacle 216, as well as interaction between the tip 232 and the stand 220. The user can then install the fastener assembly 228 without having to simultaneously support the load and align the aperture 240 with the holes 242, thereby saving time and effort. In some embodiments, the support rod 156 is magnetically attached to the receptacle 216, such that no fastener assembly is required. For instance, corresponding magnetic elements (not shown) may be provided in the collar 236 and the receptacle 216, or in the tip 232 and the stand 220.

Figure 4:
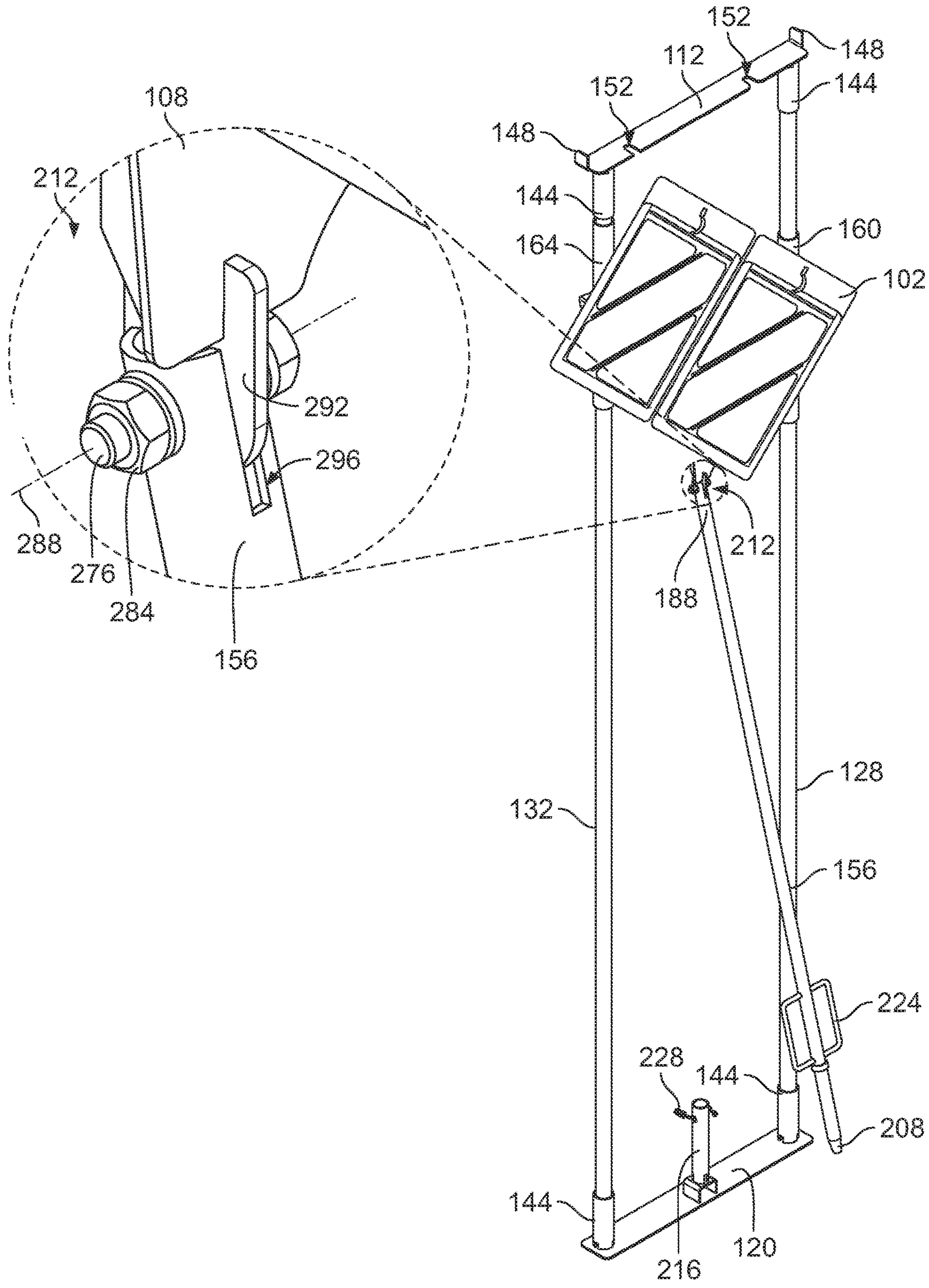
FIG. 4 is a partial, enlarged view of the mounting structure of FIG. 1 with a support rod being shown in an unfastened configuration.

Referring to FIG. 4, the link end 188 of the support rod 156 includes the hinge assembly 212 for operative connection with the backplate 108. In the illustrated embodiment, the hinge assembly 212 includes a hinge bolt 276 that is inserted through an aperture (not shown) on the link end 188 of the support rod 156 and secured thereto by a nut 284. The hinge bolt 276 defines a hinge axis 288 in the second direction of the second axis 140, about which the support rod 156 can be rotated during operation. Further, the hinge bolt 276 extends through a flange 292 that is provided on the backplate 108 to link or connect the support rod 156 to the backplate 108. The flange 292 is received within a slot 296 that is formed in the link end 188 of the support rod 156, which permits rotation or movement of the support rod 156 about the hinge axis 288 in a third direction or depth direction that is perpendicular to the second direction. Accordingly the hinge axis 288 extends in parallel with the second axis 140, along the second direction, while the tip end 208 of the support rod 156 is configured to be rotated in the depth direction for movement toward or away from the receptacle 216 during operation. Thus, the support rod 156 is configured to be rotated about the hinge axis 288 to be angled or offset relative to the first direction of the first axis 136.

Turning briefly back to FIG. 2, the retention panel 102 is illustrated in the raised configuration 200 above a midplane 300 that bisects the mounting structure 100 between the top end 116 and the bottom end 124. The midplane 300 extends in parallel with the second axis 140 along the second direction and is located centrally between the top bracket 112 and the bottom bracket 120. In the illustrated embodiment, the entire retention panel 102 is located above the midplane 300 in the raised configuration 200. When the retention panel 102 is moved to a lowered configuration or lowered position 304, as illustrated schematically in FIG. 8, the retention panel 102 can be disposed entirely below the midplane 300 and adjacent the bottom end 124 of the mounting structure 100 for affording access by a user.

Figure 6:
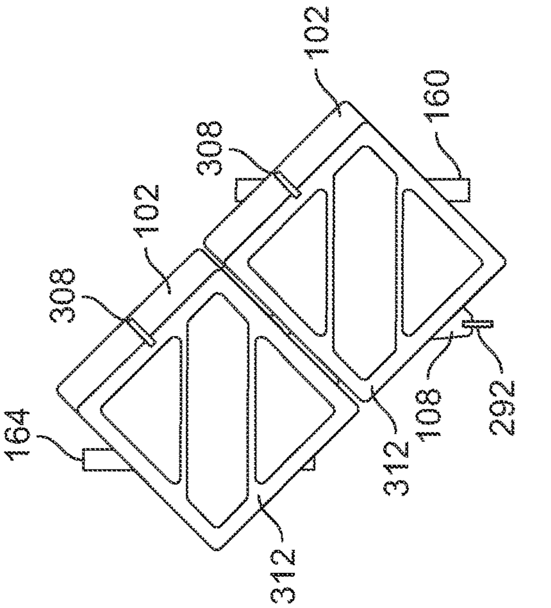
FIG. 6 is a front view of a dual configuration of a retention panel for use with a mounting structure.
Figure 5:
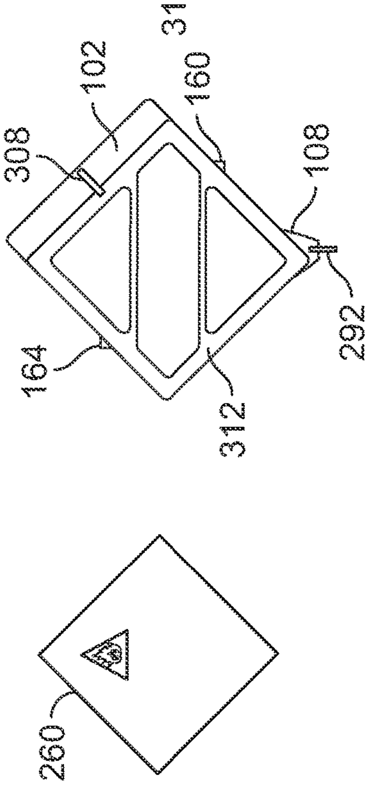
FIG. 5 is a front view of a single configuration of a retention panel for use with a mounting structure.
Figure 7:
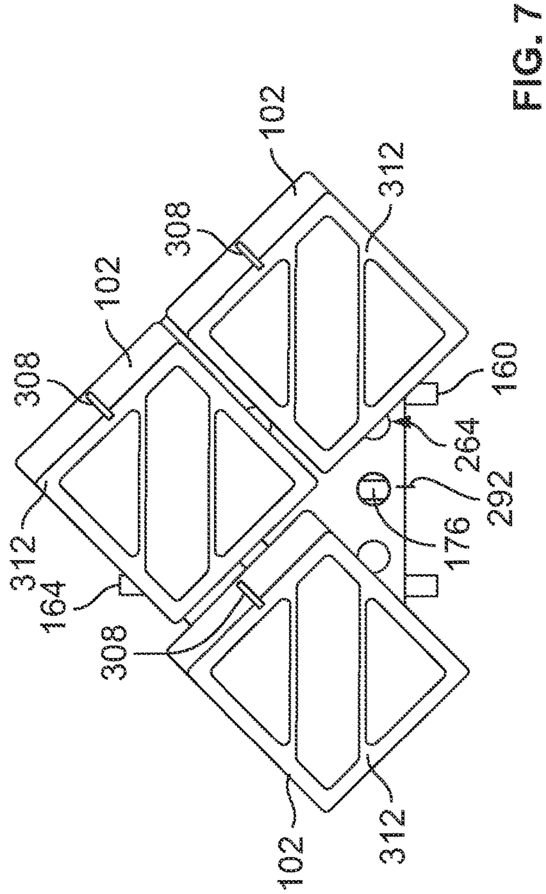
FIG. 7 is a front view of a triple configuration of a retention panel for use with a mounting structure.

FIG. 5 depicts the retention panel 102 and the backplate 108 provided in a single configuration, such that one placard 260 can be carried by the retention panel 102 in connection with the placard mounting structure 100. The single retention panel 102 is depicted as being centrally disposed on the backplate 108 relative to the spine 176. FIG. 6 depicts the retention panel 102 and the backplate 108 in a dual configuration, such that two placards 260 can be carried in connection with the placard mounting structure 100. The retention panel 102 is provided as a set of two, identical retention panels connected to the backplate 108. One of the retention panels 102 is disposed vertically below and horizontally offset from the other. FIG. 7 depicts the retention panel 102 the backplate 108 in a plural configuration, such that more than two, e.g., three, placards 260 can be carried in connection with the placard mounting structure 100. The retention panel 102 is provided as a set of three, identical retention panels connected to the backplate 108. One of the retention panels 102 is disposed vertically above and centrally between the other two retention panels in a triangular formation. Accordingly, the retention panel 102 and the backplate 108 can be provided in various configurations that vary in at least one of a location and a number of retention panels 102. As illustrated in FIGS. 5-7, each retention panel 102 includes a clip 308 and framing 312 for retaining the placard 260.

Figure 8:
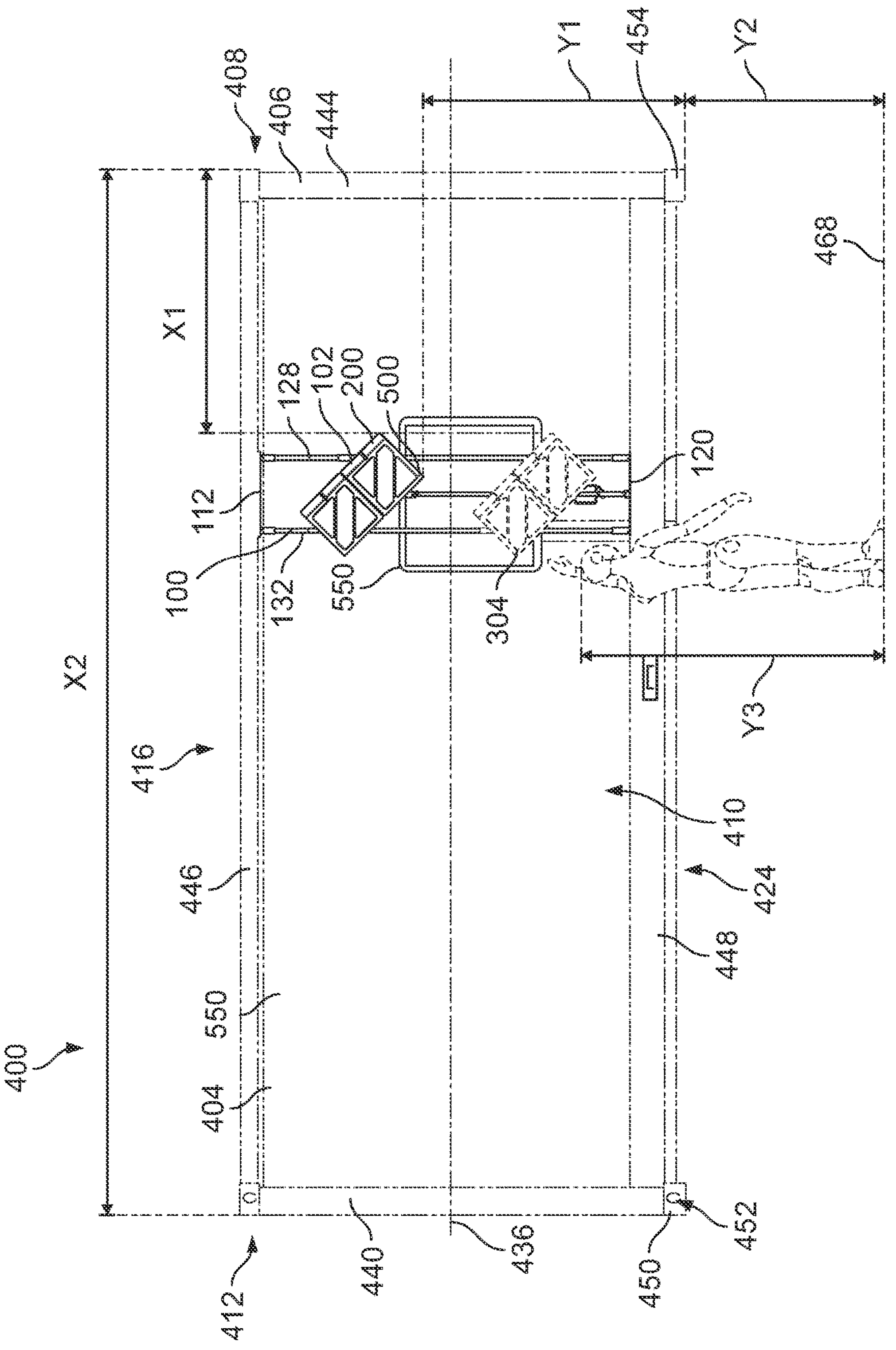
FIG. 8 is a schematic view of the mounting structure of FIG. 1 mounted to a tank container.

FIG. 8 illustrates an embodiment of a tank container 400 including a vessel 404 that is mounted to a frame 406. The tank container 400 includes a front end 408, opposite a rear end 412, a curb side 410, opposite a street side (not shown), and a top end 416 opposite a bottom end 424. It will be appreciated that the front end 408, rear end 412, curb side 410, street side (not shown), top end 416, and bottom end 424 are regions of the tank container 400 which may be referenced with respect to one or more components, e.g., the vessel 404 or the frame 406, of the tank container 400 for reference. The tank container 400 and the vessel 404 can be designed in compliance with the American Society of Mechanism Engineers (ASME) VIII Division 1 standards and also with various U.S. Department of Transportation (USDOT) regulations, e.g., U.S. 49 C.F.R. § 180.407 ("USDOT 407"). In addition, the frame 406 can be fashioned in compliance with the International Organization for Standardization (ISO) Standard 1496/3, the International Convention for Safe Container (CSC), and the Convention on International Transport of Goods Under Cover of TIR Carnets (TIR). Further, the frame 406 can be designed to be Transport Canada (TC) Impact Approved.

Referring to FIG. 8, the tank container 400 defines a tank axis 436 that intersects the rear end 412 and the front end 408 and extends centrally through the vessel 404. The tank axis 436 defines a vertical, central plane (not shown) that bisects the tank container 400, such that the curb side 410 is located opposite the street side (not shown) relative to the vertical, central plane of the tank axis 436. Accordingly, the tank axis 436 extends in a horizontal, front-to-rear or rear-to-front direction, and the vertical, central plane extends in a vertical direction, i.e., top-to-bottom or bottom-to-top direction.

With reference to FIG. 8, the frame 406 is a generally rectangular, prism-shaped structure including rear vertical members 440 at the rear end 412 and front vertical members 444 at the front end 408. Upper side rails 446 extend between the rear vertical members 440 and the front vertical members 444, and the upper side rails 446 are located at the top end 416 of the tank container 400. Further, lower side rails 448 extend between the rear vertical members 440 and the front vertical members 444 at the bottom end 424 of the tank container 400. For purposes of brevity and clarity, the rear members 440, front members 444, upper side rails 446, and lower side rails 448 will be discussed in the singular form with reference to FIG. 8.

With reference to FIG. 8, a plurality of corners 450 are formed at intersections among the aforementioned members of the frame 406. The corners 450 can include features for rigging, i.e., lifting holes or eyes 452, that are formed on or through the corners 450 of the frame 406. In addition, feet 454 extend from the corners 450 at the bottom end 424 of the frame 406 for supporting the tank container 400 on a ground surface 468 and/or for engagement with a vehicle chassis and/or securing mounts. The frame 406 is also configured to be stacked on top of or underneath other tank containers. The vessel 404 includes a generally cylindrical shell (not shown) that defines an internal volume and that is surrounded by a plurality of cladding panels 550. Further, the cladding panels 550 are attached to one another and to the shell to form a spacing (not shown) between the shell and the cladding 550. The shell is insulated with polyurethane panels having a thickness of about 75 mm (about 3 inches), although other configurations are possible. Further, the cladding panels 550 are provided in the form of high impact panels having a thickness of about 1.6 mm (about 0.0625 inch) that are painted with a glass fiber reinforced plastic and/or resin. All joints and/or seams of the cladding panels 550 are sealed with silicone.

With reference to FIGS. 1 and 8, the mounting structure 100 is configured to be attached to the frame 406 of the tank container 400 for positioning the retention panel 102 at a distance Y1 from the foot 430 of the frame 406. When in the raised configuration 200, the distance Y1 may be between about 54 inches (1371 mm) and about 66 inches (1676 mm). In the illustrated embodiment, when mounted to the curb side 410 of the tank container 400, the mounting structure 100 is located a distance X1 from the front member 444 of the frame 406 to the retention panel 102. The distance X1 is between about 10% and about 50% of a total distance X2 of the tank container 400. Further, the top bracket 112 of the mounting structure 100 is attached to the upper side rail 446 and the bottom bracket 120 is attached to the lower side rail 448. The top bracket 112 and bottom bracket 120 may be fastened to the frame 406 using fasteners (not shown), or by another suitable methods, such as, e.g., welding. Additionally or alternatively, the mounting structure 100 can be disposed in other locations along the tank container 400, such as, e.g., on the street side (not shown) or on the rear end 412.

With reference to FIGS. 2 and 8, in the raised configuration, the retention panel 102 is located above the tank axis 436 to be closer to the upper side rail 446 than to the lower side rail 448, such that a lowermost corner or point 500 of the retention panel 102 is spaced above a central, horizontal plane (not shown) extending horizontally through the tank axis 436 and from the curb side 410 to the street side (not shown). During operation, the user can unfasten the fastener 230 from the receptacle 216, raise the support rod 156 out of the receptacle 216, and lower the support rod 156 and retention panel 102 to the lowered position 304 where the lowermost corner 500 of the retention panel 102 is located adjacent the bottom bracket 120 and the lower side rail 448 of the frame 406, below the tank axis 436. In the lowered position 304, the distance Y1 can be between about 21 inches (533 mm) and about 39 inches (990 mm). In other words, the distance Y1 can be reduced by at least about 40%, or at least about 50% or at least about 60% when the retention panel 102 is moved from the raised configuration 200 to the lowered position 304. Relatedly, the foot 454 of the frame 406 is referenced herein as the lowermost point that is disposed at a distance Y2 from the ground 468, which may vary depending on the use of the tank container 400. In the illustrated embodiment, the retention panel 102 is movable from the raised position 200 to the lowered position 304 to allow the user of average height Y3 standing on the ground to reach the retention panel 102 for servicing the placard 260 or mounting structure 100, preferably without requiring the assistance of a stool, step ladder, or other height assistive device. For instance, the user may need to switch the placard 260 to provide warnings, cautions, or other notices associated with the payload, especially when changing or replacing payloads. An average height Y3 of the user may be between about 68 inches (1727 mm) and about 72 inches (1828 mm).

Figure 10:
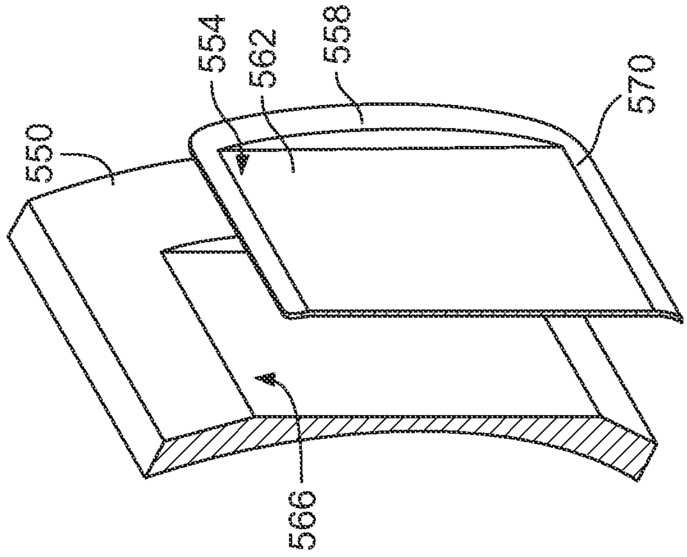
FIG. 10 is a cross-sectional view of the cladding insert of FIG. 9 taken along the lines A-A.
Figure 9:
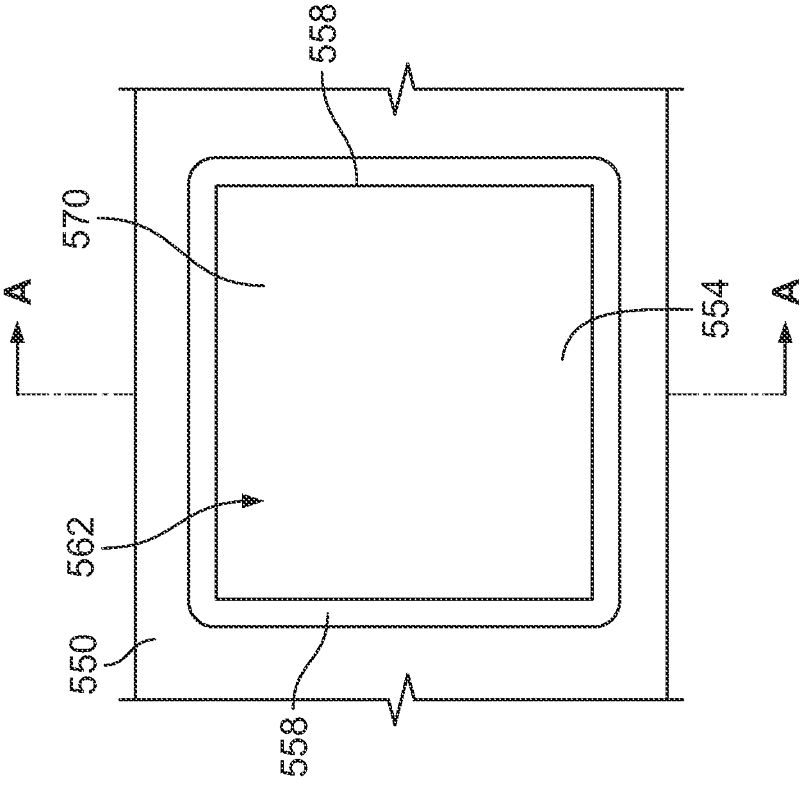
FIG. 9 is a front view of a cladding insert for the tank container of FIG. 8.

Still referring to FIG. 8, the mounting structure 100 is mounted to the curb side 410 adjacent the vessel 404 and extends from the top end 416 to the bottom end 424 of the frame 406. Due to the size and cylindrical shape of the vessel 404 and the cladding panels 550, a cladding insert 570 is provided to allow the mounting structure 100 to extend linearly between the upper side rail 446 and the lower side rail 448. As depicted in FIGS. 9 and 10, the cladding insert 570 includes a recessed surface 554 that is formed between opposing bumpers 558 to form a mounting recess 562 through which the mounting structure 100 can extend to provide enough space for the retention panel 102 and backplate 108 to move between the raised configuration 200 and the lowered configuration 304 (see FIG. 8). The cladding insert 570 is received in a cutout 566 formed in the cladding panels 550 of the vessel 404. The cladding insert 570 is depicted as being rectangular- or square-shaped, but other shapes are contemplated. Further, the cladding insert 570 can be made of a metal material, a composite material, or any suitable material. The cladding insert 570 is configured to be attached to the vessel 404. In some instances, the cladding insert 570 is integrally formed with the cladding panels 550 of the vessel 404.

It will be appreciated that the present disclosure encompasses placard mounting structures and placards which are manufactured, mounted, and used in compliance with applicable transportation standards, such as, e.g., 49 C.F.R. §§ 100-185, Recommendations of the Association of American Railroads, Part 4 of Transport Canada TDG Regulations, and the like, including UN Recommendations, Hazardous Materials Recommendations, International Civil Aviation Organization (ICAO) Technical Instructions, or International Maritime Dangerous Goods (IMDG) Code. For example, the Association of American Railroads recommends that placards be placed at least 60 inches (1524 mm) above the bottom rail of any cage or support structure of a portable tank container on the sides and ends thereof, and at least 60 inches (1524 mm) from the corner post or end support of the portable tank container on the sides thereof. When the portable tank containers are loaded onto a vehicle or railcar, at least about 45 inches (1143 mm) is added to the overall height of the portable tank container. In such instances, operators are unable to reach the placard holder from the ground surface without using access equipment, such as ladders. Embodiments of the mounting structure 100 disclosed herein are provided to afford a single user the ability to lower the retention panel 102 and replace or remove placards from the ground 468 (see FIG. 8), while also being able to raise the retention panel 102 back to a height, e.g., Y1, in compliance with the aforementioned recommendations and standards.

It will be further appreciated that the present disclosure is not limited to the mounting structure 100 being used in connection with the frame 406 of the portable tank container 400. It is within the scope of the present disclosure that the mounting structure 100 can be used to indicate information about the contents of any container, such as, e.g., railcars, freight containers, waste receptacles, or any container of any size or shape. Further, the mounting structure 100 may be used to indicate information associated with places or areas, such as, e.g., a building or a room therein, a public space, or a private space. Further, the mounting structure 100 can be used to indicate information associated with any vehicle, such as, e.g., automobiles, trucks, railcars, airplanes, spacecraft, maritime vessels, submarines, or any vehicle of any size or shape.

Although various aspects are herein disclosed in the context of certain preferred embodiments, implementations, and examples, it will be understood by those skilled in the art that the present invention extends beyond the specifically disclosed embodiments to other alternative embodiments and/or uses of the inventive aspects and obvious modifications and equivalents thereof. In addition, while a number of variations of the aspects have been noted, other modifications, which are within their scope, will be readily apparent to those of skill in the art based upon this disclosure. It should be also understood that the scope of this disclosure includes the various combinations or sub-combinations of the specific features and aspects of the embodiments disclosed herein, such that the various features, modes of implementation and operation, and aspects of the disclosed subject matter may be combined with or substituted for one another. Thus, it is intended that the scope of the present invention herein disclosed should not be limited by the particular disclosed embodiments or implementations described above but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

The invention claimed is:

1. A device for holding a placard, the device comprising:

a backplate that is engaged with a rail structure; and a retention panel that is engaged with the backplate and configured to receive a placard, the retention panel and the backplate being movable between a first position adjacent an end of the rail structure and a second position that is spaced apart from the end of the rail structure, wherein the rail structure includes a first rail and a second rail extending parallel with one another in a first direction, and wherein the retention panel is configured to engage the backplate in a plurality of configurations that vary in at least one of a location and a number of retention panels.

2. The device of claim 1, wherein the first and second rails are spaced apart from one another in a second direction that is perpendicular to the first direction.

3. The device of claim 1, wherein the backplate includes a first sleeve in connection with the first rail and a second sleeve in connection with the second rail, wherein the first and second sleeves are configured to slide along the first and second rails.

4. The device of claim 1, wherein the end of the rail structure is a bottom end that is opposite a top end, the bottom end including a bottom bracket that connects the first rail to the second rail.

5. The device of claim 4, wherein the rail structure is configured to be mounted to a frame, such that a distance is defined between a lowest point of the retention panel and a lowermost point of the frame, and wherein the distance is reduced by at least 60% when the retention panel is moved between the first position and the second position.

6. The device of claim 5, wherein, in the second position, the distance is between about 54 inches and about 66 inches.

7. A device for holding a placard, the device comprising:

a first rail and a second rail extending parallel with one another in a first direction, the first and second rails being spaced apart from one another in a second direction that is perpendicular to the first direction;

a backplate that is engaged with each of the first rail and the second rail; and a retention panel that is engaged with the backplate and configured to receive a placard, wherein the backplate is movably coupled to a support rod by a hinge, and wherein the support rod is configured to be rotated about a hinge axis that extends in parallel with the second direction.

8. The device of claim 7, wherein the retention panel is configured to be movable in the first direction.

9. The device of claim 7, wherein the support rod is removably attached to a bottom bracket that extends in parallel with the second direction between the first rail and the second rail.

10. The device of claim 7, wherein, in a first configuration, the support rod is disposed parallel with the first and second rails in the first direction and the support rod is centrally disposed between the first and second rails relative to the second direction.

11. The device of claim 10, wherein, in a second configuration, the support rod is rotated about the hinge axis and offset relative to the first direction.

12. The device of claim 7, wherein the first direction is a vertical direction and the second direction is a horizontal direction.

13. A device for holding a placard, the device comprising:

a retention panel that is engaged with a backplate;

a support rod that is engaged with the backplate;

and a receptacle in which an end of the support rod is removably received, wherein, when the end of the support rod is received in the receptacle, the support rod is configured to support the retention panel in a raised position, wherein the backplate is configured to slide along a rail structure between the raised position and a lowered position, and wherein, in the raised position, the retention panel is disposed above a midplane that bisects the rail structure between a top bracket and a bottom bracket.

14. The device of claim 13, wherein the end of the support rod is removably secured to the receptacle by a fastener.

15. The device of claim 14, wherein the support rod includes a handle disposed adjacent the end, such that the handle is located above the receptacle when the end is received therein.

16. The device of claim 15, wherein the support rod includes an upper end that is hingedly attached to the backplate.

17. The device of claim 13, wherein, in the lowered position, the retention panel is disposed below the midplane.

18. The device of claim 13, wherein the retention panel includes a plurality of retention panels.

19. A device for holding a placard, the device comprising:

a first rail and a second rail extending parallel with one another in a first direction, the first and second rails being spaced apart from one another in a second direction that is perpendicular to the first direction;

a backplate that is engaged with each of the first rail and the second rail; and a retention panel that is engaged with the backplate and configured to receive a placard, wherein the backplate is movably coupled to a support rod by a hinge, and wherein the first direction is a vertical direction and the second direction is a horizontal direction.

20. A device for holding a placard, the device comprising:

a retention panel that is engaged with a backplate;

a support rod that is engaged with the backplate;

and a receptacle in which an end of the support rod is removably received, wherein, when the end of the support rod is received in the receptacle, the support rod is configured to support the retention panel in a raised position, and wherein the retention panel includes a plurality of retention panels.

* * * * *